United States Patent
Schramm et al.

[11] Patent Number: 5,954,407
[45] Date of Patent: Sep. 21, 1999

[54] PROCESS AND DEVICE FOR AN OPEN-LOOP CONTROL AND A CLOSED-LOOP CONTROL OF A BRAKE SYSTEM OF A VEHICLE

[75] Inventors: Dieter Schramm, Stuttgart; Frieder Keller, Bretten; Andreas Kellner, Möglingen; Peter Blessing, Heilbronn, all of Germany

[73] Assignee: Robert Bosch GmbH, Stuttgart, Germany

[21] Appl. No.: 08/913,837

[22] PCT Filed: Feb. 28, 1996

[86] PCT No.: PCT/DE96/00331

§ 371 Date: Feb. 10, 1998

§ 102(e) Date: Feb. 10, 1998

[87] PCT Pub. No.: WO96/29218

PCT Pub. Date: Sep. 26, 1996

[30] Foreign Application Priority Data

Mar. 23, 1995 [DE]  Germany ............................ 195 10 525

[51] Int. Cl.[6] ............................................. B60T 8/34
[52] U.S. Cl. ........................................ 303/155; 303/113.4
[58] Field of Search .................................. 303/155, 113.4

[56] References Cited

U.S. PATENT DOCUMENTS

| | | | |
|---|---|---|---|
| 1,952,679 | 3/1934 | Leveen | 188/158 |
| 4,671,576 | 6/1987 | Fourie | 303/155 |
| 4,784,442 | 11/1988 | Petersen | 303/3 |
| 5,230,549 | 7/1993 | Osada et al. | 303/3 |
| 5,572,187 | 11/1996 | Williford | 188/1.11 |

FOREIGN PATENT DOCUMENTS

| | | |
|---|---|---|
| 403136963 | 6/1991 | Japan . |
| 40423214 | 8/1992 | Japan . |
| 001149488 | 4/1969 | United Kingdom . |

Primary Examiner—Robert J. Oberleitner
Assistant Examiner—Robert A. Siconolfi
Attorney, Agent, or Firm—Kenyon & Kenyon

[57] ABSTRACT

A process and device for an open-loop control and a closed loop control of the brake system of a vehicle, wherein brake pedal actuation is measured by at least two, preferably diversitary, measuring devices, and the driver's braking command is independently obtained and further processed from at least two actuation signals. A third measuring device, measuring brake pedal actuation, is provided for locating errors. The control device effecting the open-loop control and the closed-loop control of the brake system comprises at least two microcomputers with the signals of the at least two measuring devices being supplied to both, while the signal of the monitoring device is only supplied to one microcomputer.

12 Claims, 8 Drawing Sheets

5,954,407

PROCESS AND DEVICE FOR AN OPEN-LOOP CONTROL AND A CLOSED-LOOP CONTROL OF A BRAKE SYSTEM OF A VEHICLE

FIELD OF THE INVENTION

The present invention relates to a process and device for controlling a brake system of a vehicle.

BACKGROUND INFORMATION

Such a process and such a device are known, for example, from U.S. Pat. No. 5,230,549 describes a conventional process and device, where a brake system with an electronic control unit actuates the wheel brakes as a function of the actuation of an operating element (brake pedal) by the driver. Actuation of the brake pedal is sensed both by a first sensor, which senses the actuation force and by a second sensor, which senses the path traveled by the pedal. For open- or closed-loop control of the brake system, a value for the driver brake command is formed from one of the measured quantities, in particular a setpoint for a control loop to actuate the brakes. The measured quantities such as actuating force or pedal path are selected according to the operating parameters such as deceleration or by the actual measured quantities. Since in this conventional process the braking effect of the brake system depends on the brake command, in the case of an error in sensing the brake command, in particular in sensing actuation, or in the case of an error in the electronic control unit itself, an undesired braking effect may be produced. No measures are described in U.S. Pat. No. 5,230,549 to detect an error or to control the brake system in the case of an error.

The object of the present invention is to provide measures to improve braking command detection in an open- or closed-loop control of the braking system of a vehicle with respect to possible error conditions.

SUMMARY OF THE INVENTION

The operating reliability of the brake system is ensured and error conditions in braking command detection are reliably identified by using three sensors to detect pedal actuation, each preferably operating via a different measuring principle.

This makes it possible to locate any errors and to perform open- or closed-loop control of the brake system without being limited by fail-safe elements, which results in considerable increase in the availability of the braking system.

It is also advantageous that a redundant measuring system with redundant processing channels is provided for determining the braking command.

An optional simple monitoring component with low accuracy requirements ensures location of a defective channel.

It is further advantageous to formulate equivalent values for the braking command in operating areas where an error condition cannot be located.

These measures according to the present invention are advantageously used in conjunction with all conventional measurement principles for pedal force and pedal path sensing, as well as with all conventional brake systems whether hydraulic, pneumatic, or electric, with or without emergency brakes.

The measures according to the present invention are also used in conjunction with braking force definition, vehicle deceleration definition, braking torque definition, braking power definition, braking pressure definition, etc., for open- and closed-loop brake control, i.e., for all defined parameters representing the braking effect.

It is further advantageous to design the open- or closed-loop control system with at least two microcomputers that are independent of one another.

DETAILED DESCRIPTION OF THE INVENTION

Figure 1:
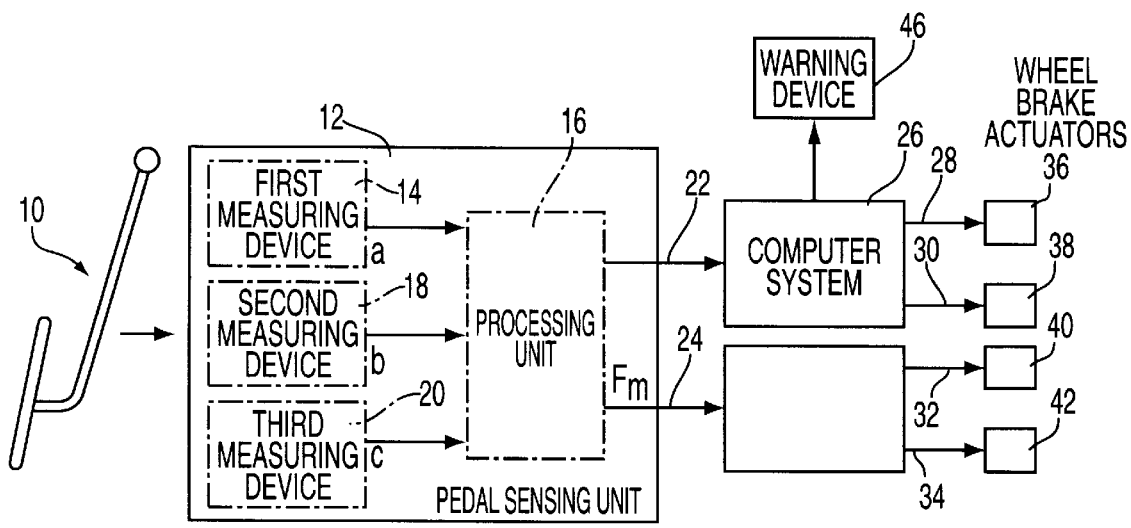
FIG. 1 shows a block diagram of a first embodiment for determining a braking command according to the present invention.

FIG. 1 shows a first embodiment for the basic design of the pedal sensing unit according to the present invention. A brake pedal 10 is connected to pedal sensing unit 12, which includes a first measuring device 14, which sends a first measuring signal a, characterizing brake pedal actuation, to processing unit 16. Furthermore, pedal sensing unit 12 also includes a second measuring device 18, which also sends a measuring signal b, characterizing brake pedal actuation, to processing unit 16. Furthermore, in one embodiment according to the present invention, a monitoring component 20 is also provided, which also sends a measuring signal c, characterizing brake pedal actuation, to processing unit 16. At least measuring signals a and b are generated independent of one another. A "diversitary" design, with the measuring devices operating via different measuring principles, can be particularly advantageous. In a preferred embodiment according to the present invention, measuring device 14 senses pedal path s, while first measuring device 18 detects actuating force FP. In another embodiment according to the present invention, first measuring device 14 detects pedal angle α, while measuring device 18 detects pedal pressure p. In the preferred embodiment, measuring devices 14 and 18 are also powered from separate power sources. Monitoring component 20 provides additional information to check the measured values supplied by measuring devices 14 and 18. In one embodiment, the monitoring component has an additional, independent measuring device 20, which measures a measured value (e.g. pedal path s or pedal force FP) representing pedal actuation. This measurement is performed, in this embodiment according to the present invention, with reduced accuracy compared to the accuracy of measuring devices 14 and 18. Measuring the same physical parameters using different measuring principles is also possible.

In one embodiment according to the present invention, independent communication paths, preferably two conductors 22 and 24, run from processing unit 16 to a computer system 26. A driver's braking command issued in response to the pedal actuation is transmitted via conductors 22 and 24 to computer system 26. This braking command represents a measurement of the desired braking effect of the brake system and, in one embodiment, it represents the braking force Fm. In addition to the braking force parameters representing the braking torque, the braking pressure, the vehicle deceleration, the braking power, etc. can be determined in processing unit 16 from the actuation signals and sent to computer system 26.

Computer system 26 converts the braking command value obtained into setpoints for the wheel brakes, taking into account the desired braking force distribution, the lining wear, the axle load, etc. These setpoints represent, e.g., the braking pressure to be set at the wheel brakes. In addition, these setpoints may also represent the braking force, the braking torque, etc. to be set. In one embodiment, computer system 26 sends individual setpoints or triggering signals for each wheel, through conductors 28, 30, 32, and 34, to wheel brake actuators 36, 38, 40, and 42 for setting these setpoints. Computer system 26 is connected to a warning device 46 through a conductor 44; warning device 46 displays a brake system error message to the driver.

Figure 2:
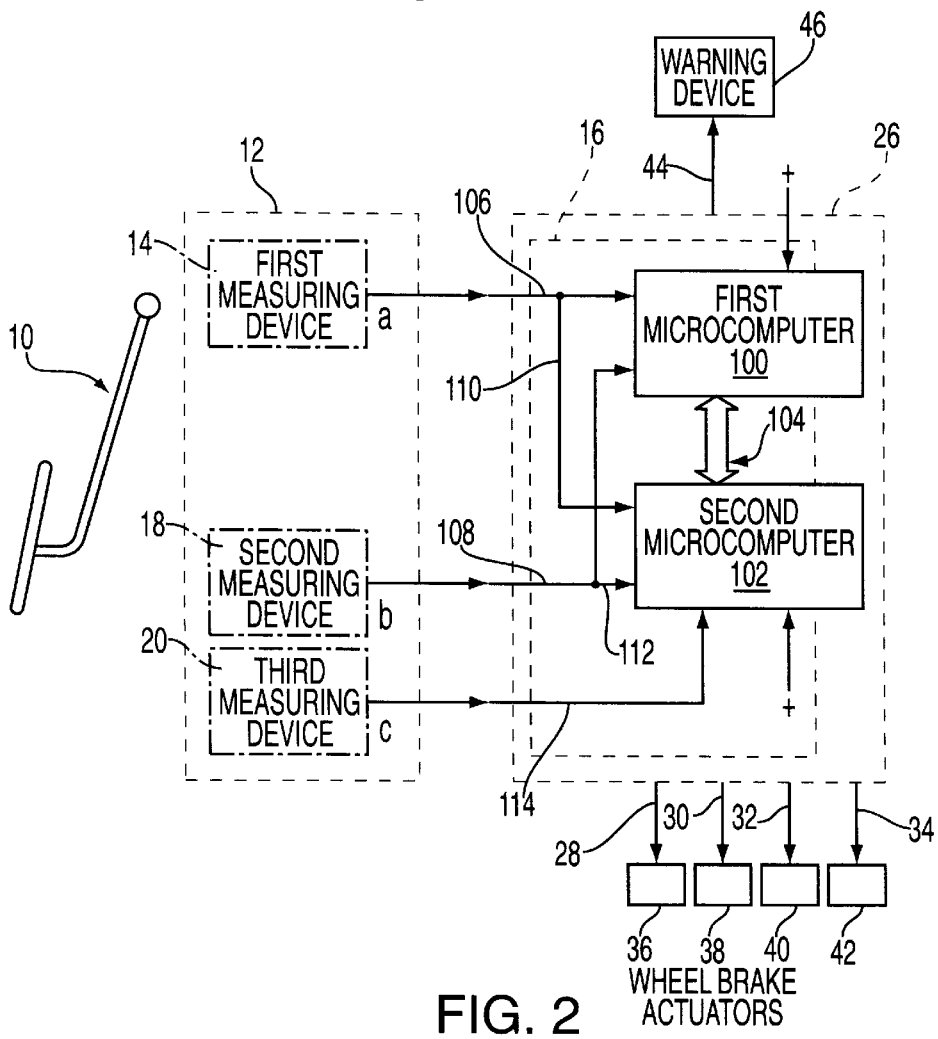
FIG. 2 shows a block diagram of a second embodiment for determining the braking command according to the present invention.

Another embodiment according to the present invention provides for the integration of processing unit 16 into computer system 26, which is illustrated in FIG. 2. In this embodiment, measuring signals a, b, and c of pedal detection system (unit) 12 are supplied to computer system 26 via appropriate conductors.

Figure 3:
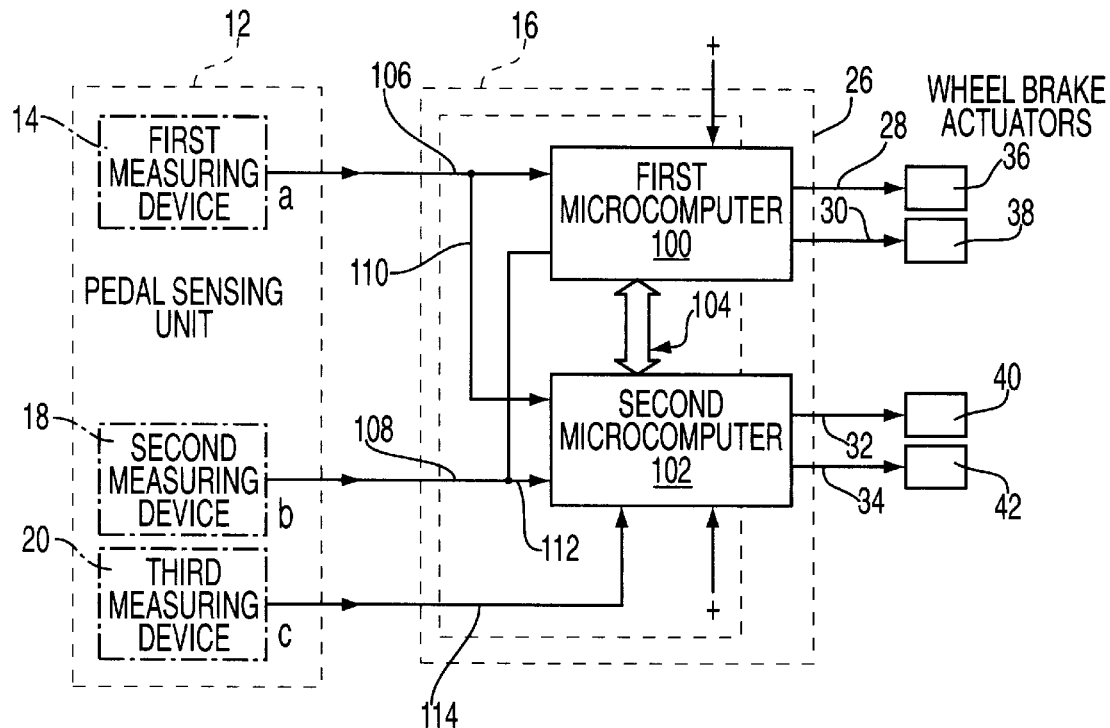
FIG. 3 shows a block diagram of a computer system according to the present invention.

Another exemplary embodiment of processing unit 16 and computer system 26 is illustrated in FIG. 3. Computer system 26 includes two microcomputers 100 and 102, which exchange information and commands via a communication system 104. In this embodiment, microcomputer 100 is connected to first power supply E1, and microcomputer 102 is connected to second power supply E2, power supplies E1 and E2 being independent of one another. Microcomputer 100 receives measuring signal a from measuring device 14 via conductor 106 and measuring signal b from measuring device 18 via conductor 108. Microcomputer 102 receives measuring signal a via conductor 110 branching off conductor 106, and measuring signal b via conductor 112 branching off conductor 108. Furthermore, microcomputer 102 receives measuring signal c of monitoring component 20 via conductor 114. Microcomputers 100 and 102 also have output conductors 28 through 34 to control actuators 36 through 42. It is advantageous for computer system 26 to have two different processing channels (which correspond to the brake circuits).

Two microcomputers 100 and 102 communicate with one another via communication system 104. The information of the monitoring components is normally only supplied to one microcomputer, which forwards it to the second microcomputer via communication system 104. Two microcomputers 100 and 102 process the functions described below for error detection and braking command or setpoint definition independently of one another. In this embodiment, the computations are executed in duplicate in independent program areas. The respective computations are exchanged between the computers via communication system 104. Thus at least three computation results are available to each microcomputer regarding error condition and/or setpoint or braking command. As described in the embodiment shown in FIG. 1, each microcomputer determines a braking command value Fm from these three computation results and transmits this result, independently of the others, over redundant channels (conductors 22 and 24) to the next computer system. In the embodiment of FIG. 2, the braking commands determined by two microcomputers 100 and 102 are exchanged again via communication system 104; then the individual setpoints for each wheel and optionally the control calculation of microcomputer 100 are executed in microcomputer 100. With the information concerning an existing fault condition and concerning measures to be taken under such conditions, the appropriate action is performed.

Two microcomputers 100 and 102 are capable of self-testing for reliability. They exchange error flags, program states, and partial results via communication system 104. When errors or inconsistent computing results appear, the defective channel, identified as described below, is shut off and an error flag is set.

In the embodiment of FIG. 1, processing unit 16 sends braking command values Fm to the next computer system in a fail-safe mode within predefined error tolerances. In addition, processing unit 16 processes the communication with computer system 26. Any pedal detection system error flags obtained are transmitted to computer system 26. The communication system used is preferably redundant and provided with error detection mechanisms.

Figure 4:
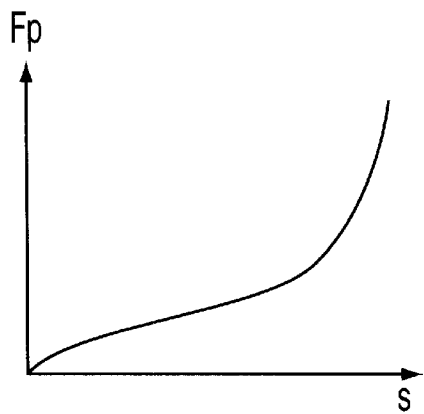
FIG. 4 shows a first diagram of a basic relationship of a pedal and braking command sensing on the basis of which the process according to the present invention operates.
Figure 5:
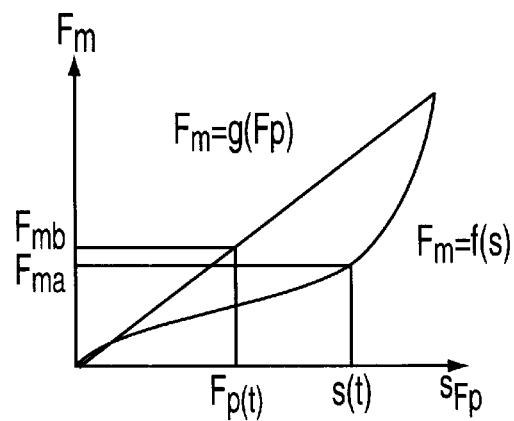
FIG. 5 shows a second diagram of the basic relationship of a pedal and braking command sensing on the basis of which the process according to the present invention operates.

The relationship, predefined by the selection of the detected measured quantities and the mechanics of the pedal detection unit, between measuring signals a and b is used for error detection. In the preferred embodiment, signal a represents pedal path s, and signal b represents pedal force FP which have the relationship illustrated in FIG. 4. The desired braking force Fm acting on the center of gravity of the vehicle is computed in processing unit 16 or computer system 26 from the measured quantities to obtain the braking command or the setpoint. This is done according to preselected functional relationships as illustrated in FIG. 5. The functional relationship between pedal path s and braking force Fm is determined from comfort-related considerations. The relationship between braking force Fm and pedal force FP is determined in a similar manner.

Braking force Fm is computed independently from both signals; braking forces Fma and Fmb are thus determined. If these braking force values coincide within a predefined, preferably operating point-dependent tolerance range, the calculated braking force Fm is used as braking command or setpoint for determining the brake actuation reference variable for each individual wheel. If inconsistency of the measured values is detected because the tolerance range has been exceeded, steps are taken to locate the fault and exclude the erroneous signal or the braking command determined on the basis of the erroneous signal from the determination of the reference variables.

Figure 6:
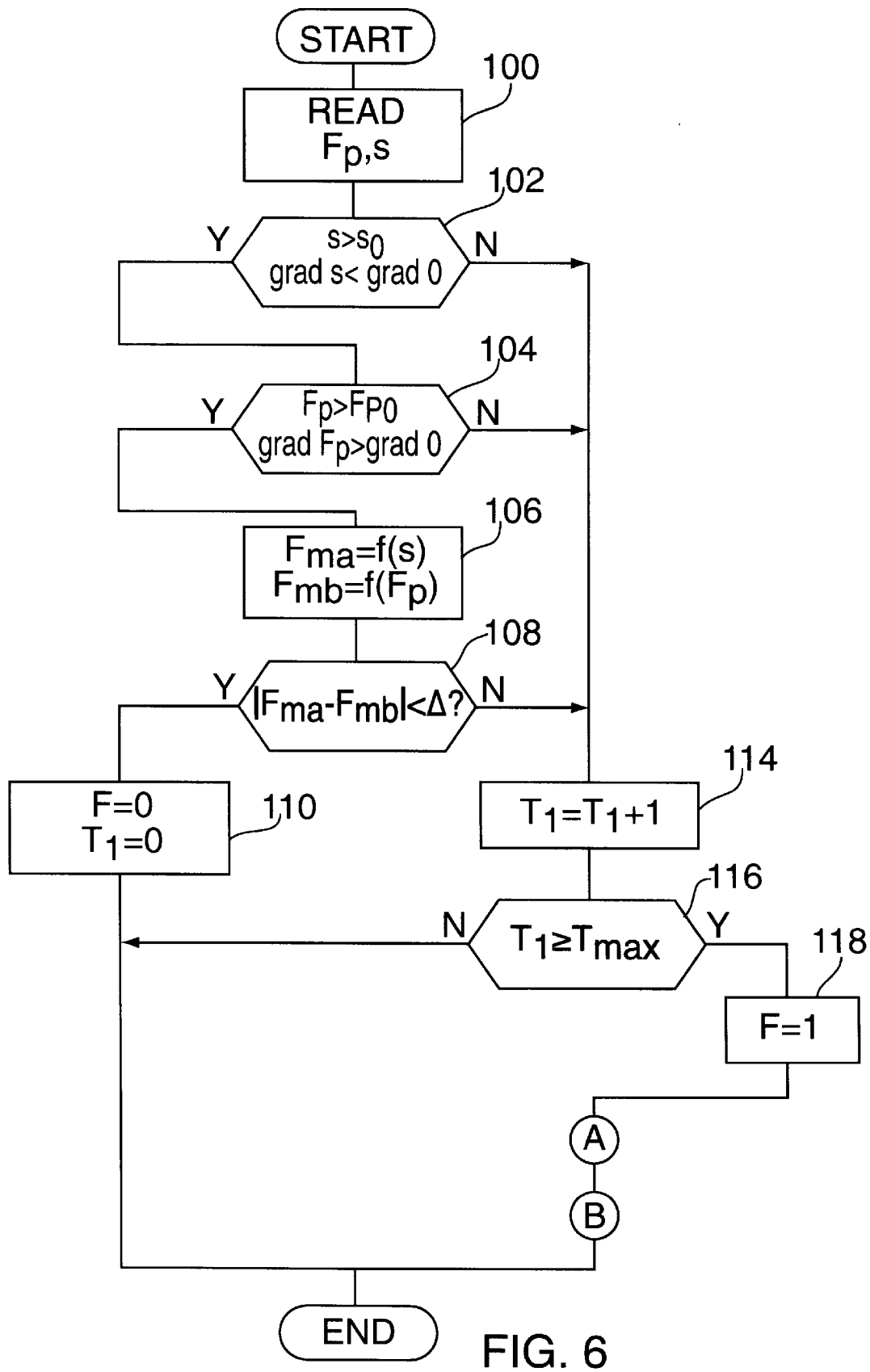
FIG. 6 shows a first flow chart of a process for identifying an error and determining a braking command according to the present invention.

FIG. 6 shows an error detection flow chart according to the present invention. After starting the subprogram at predefined points in time, signals a and b, pedal path s, and pedal force FP are read in first step 100. Then in step 102 pedal path s read is compared with a signal value s0 for non-actuated brake pedal. In step 102, the gradient of the pedal path signal is also compared with a limit value grad0. The gradient is determined by forming the difference between the current run and the previous program run. The gradient limit value represents the boundary with signal changes that are physically impossible in normal operation or occurring very seldom. If the pedal path exceeds s0 and its gradient drops below the limit value, the program continues with step 104, where a similar procedure is followed with respect to signal b, the pedal force. Thus, if the pedal force signal FP exceeds the zero value FP0 and the pedal force signal gradient drops below the gradient limit value, the braking force Fma is determined, in step 106, on the basis of the relationships illustrated in FIG. 5, from pedal path s, and braking force Fmb is determined from pedal force FP. In the subsequent query step 108, the absolute value of the difference between the two braking force values is compared to a predefined tolerance value Δ. This tolerance value depends on the operating point in the embodiment according to the present invention, i.e., it depends on the current value of the pedal path s and/or the pedal force FP. If the absolute value of the difference is within the tolerance range, an error-free function of the braking command determination is assumed and the error flag F, as well as counter T1 are set to zero in step 110, possibly after the elapse of a filtering period or after a predefined number of identical results. The determination of the braking command in normal operation is illustrated in the subprogram of FIG. 7.

If query steps 102, 104, or 108 result in negative responses, a fault in the pedal actuation detection is assumed. This is the case when the pedal path value or pedal force value is less than their zero values and/or the gradient of the respective signal is greater than the respective limit value and/or the absolute value of the difference between the braking force values determined on the basis of the signals is greater than the tolerance value. In this case a counter T1 is incremented by one in step 114 and in the subsequent query step 116 it is compared to its maximum value Tmax. If the counter status has not reached or exceeded this maximum value, the braking command is determined as in the case of correct operation. As long as the fault has not lasted for a period Tmax, a "dynamic fault" is assumed. Taking this fault into consideration when determining the braking command against the background of the inertia of the braking system is unimportant. On the other hand, a static fault is assumed if the counter status has reached or exceeded the maximum value. In this case, the error flag F is set to 1 according to step 118. Then measures are taken to locate the fault. These measures are described in detail in FIGS. 8 through 12. Determination of the braking command in the case of a fault is also illustrated in the flow chart shown in FIG. 7.

Normally both signals a and b have different dynamic characteristics. In order to take this fact into account, a correction filter is provided, which, acting as a digital delay element, delays the dynamically faster measured value in relation to the other measured value so that both signals represent the same point in time when comparison is performed in step 108.

Figure 7:
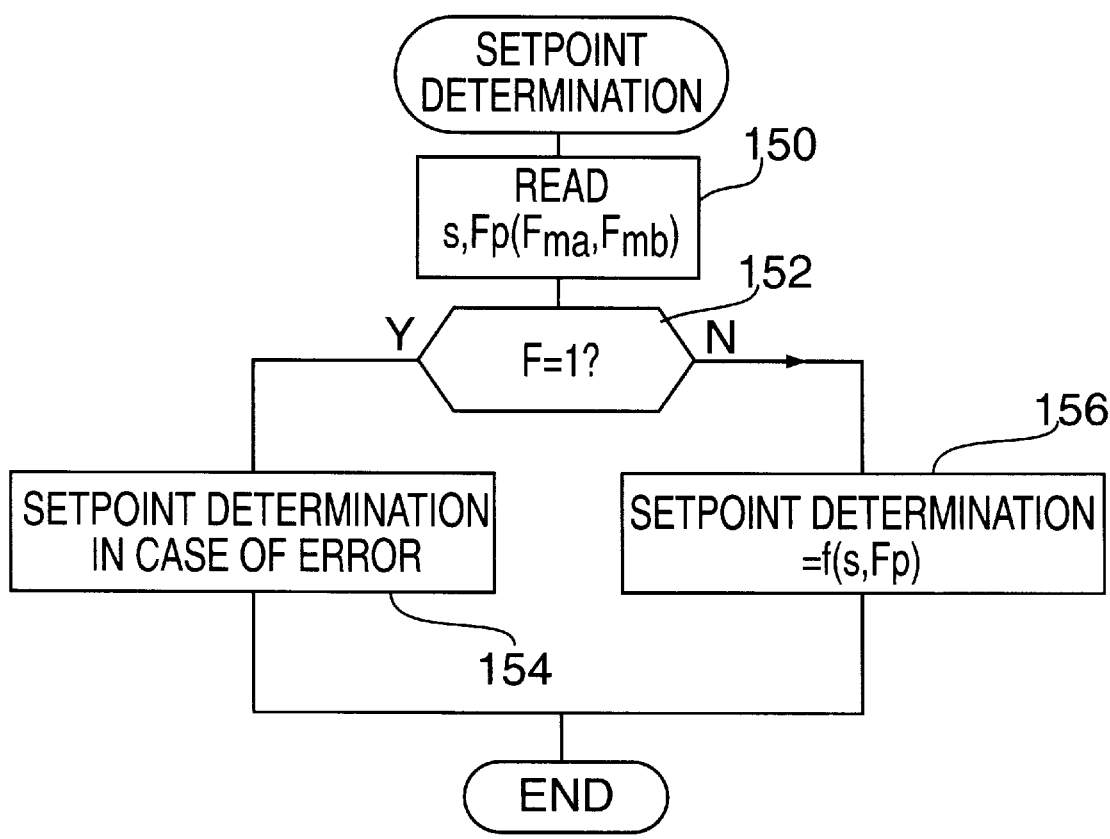
FIG. 7 shows a second flow chart of the process for identifying an error and determining a braking command according to the present invention.

An exemplary procedure for determining the braking command or the setpoint is shown in FIG. 7. After starting the subprogram at predefined points in time, pedal path s and pedal force FP, or the respective braking force values Fma and Fmb are read into microcomputers 100 and 102, possibly as the result of the selection as described above, in first step 150. Then, in step 152, it is checked whether the error flag has been set. If this is the case, in the event of an error, the braking command or setpoint calculation is determined in step 154 on the basis of the signal value or braking force value being determined error-free. If the function operates properly, the braking command or setpoint is determined in step 156 on the basis of the calculated braking force values Fma and Fmb or signal values s and FP. This is done, in this embodiment, after averaging. In other embodiments according to the present invention, a minimum or maximum or one of the values can be used in different operating areas for determining the braking command. The subprogram is ended after step 154 or 156.

Monitoring component 20 is used to locate erroneous signals. The component includes, e.g., an additional independent sensor for measuring a quantity that is representative for pedal actuation (i.e., pedal path s or pedal force FP). This measurement may have a reduced degree of accuracy compared to that of measuring devices 14 and 18. Braking force Fm, calculated from measured quantity c, is only used for detecting the error-free measuring device in the case of a static error when measuring signals a and b are inconsistent.

Figure 8:
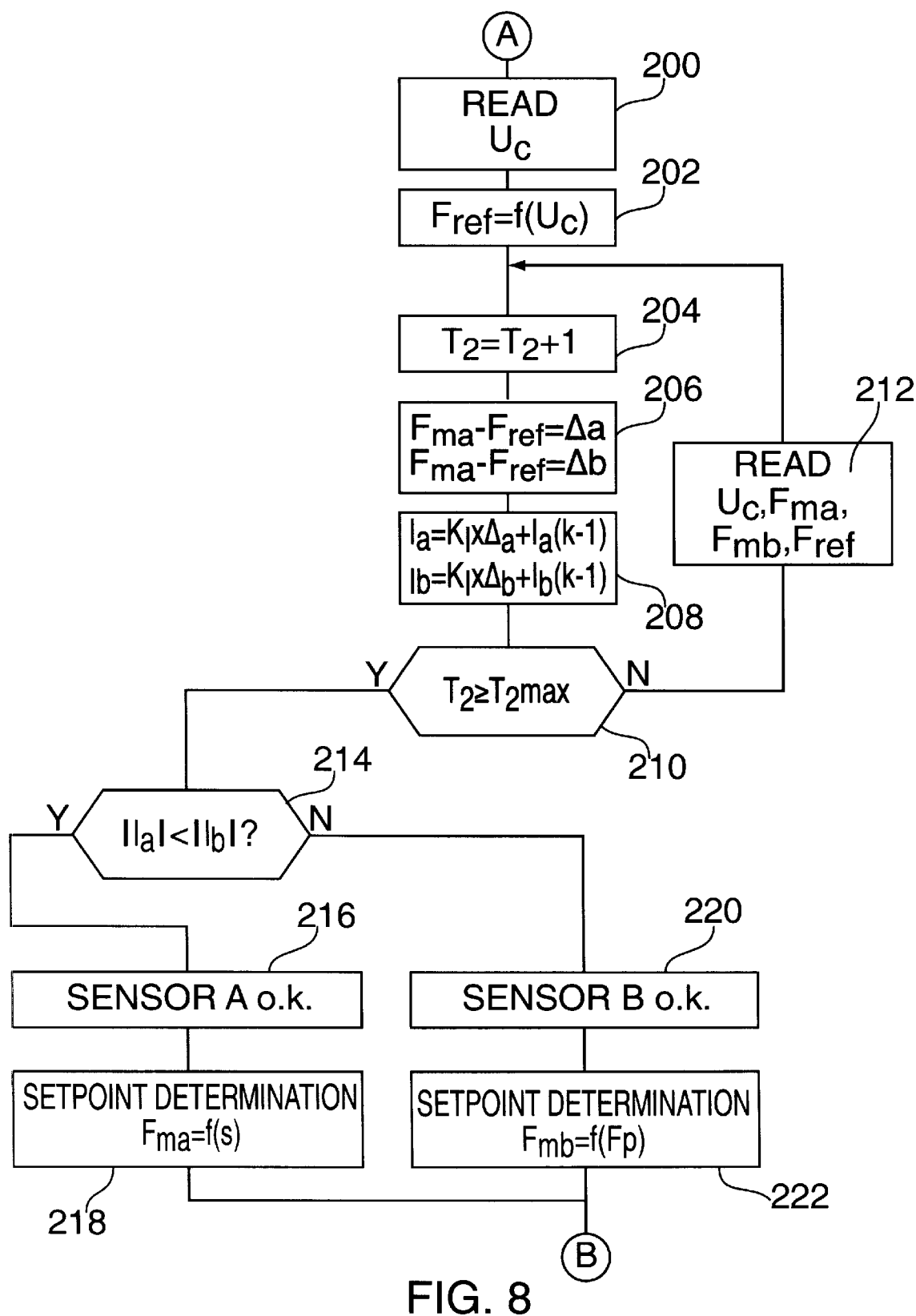
FIG. 8 shows a first embodiment of a process for identifying the error according to the present invention.

A first embodiment for locating the defect is illustrated in the flow chart of FIG. 8. For this purpose, a reference value Fref for the desired braking force is calculated from measuring signal c of the monitoring component. The error-free measuring device is determined by selecting the smaller absolute value between the integrals of the difference signals Fma minus Fref and Fmb minus Fref over a predefinable time interval.

For this purpose, measured value UC is read in first step 200 and in the subsequent step 202 the reference value Fref is determined on the basis of a relationship as illustrated in FIG. 5 from signal UC. In the subsequent step 204, a counter T2, which is reset to zero when the subprogram is activated, is incremented by 1. In the following step 206, a first difference Δa is formed between braking force Fma and reference value Fref, and a second difference Δb is formed between braking force Fmb and reference value Fref. Then in step 208 the difference is integrated over time. Two integral values Ia and Ib are formed from the respective differences Δa and Δb. In the subsequent query step 210, it is checked whether counter status T2 has reached its maximum value T2max. If this is not the case, in step 212 measured value UC and the braking forces Fma and Fmb derived from measured values s and FP are read, reference value Fref is formed, and the subprogram is repeated with step 204. If it is determined in step 210 that counter status T2 has reached its maximum value, the absolute values of integrals Ia and Ib are compared in query step 214. If the absolute value of Ia is less than Ib, then measuring device 14 is assumed to be error-free in step 216, and in step 218 Fma is selected for determining the braking command according to FIG. 7. Otherwise, measuring device 18 is assumed to be error-free in step 220, and in step 222 Fmb is selected for determining the braking command.

Figure 9A:
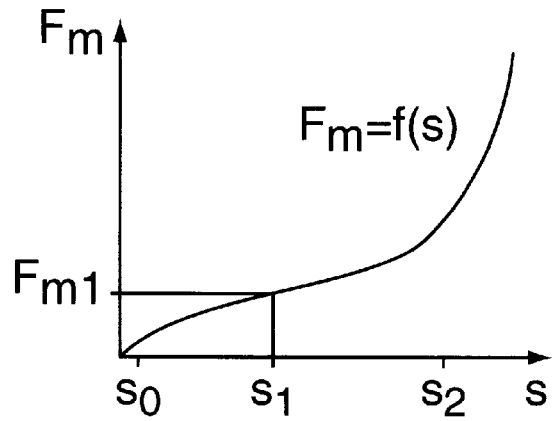
FIG. 9a shows a first diagram for using with a second embodiment for identifying the error according to the present invention.
Figure 9B:
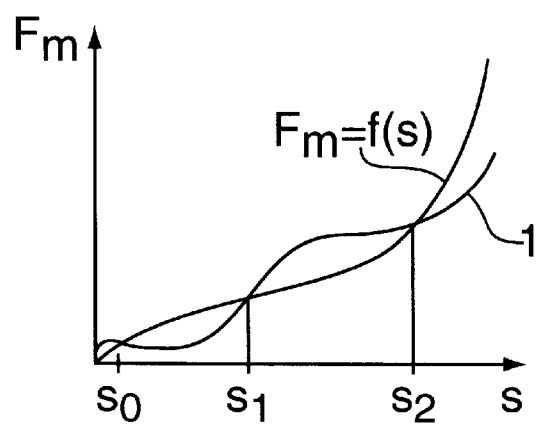
FIG. 9b shows a second diagram for using with the second embodiment for identifying the error according to the present invention.

In the previously described embodiment, the monitoring component determines pedal actuation continuously. In another embodiment, the monitoring component includes a set of binary contacts, suitably distributed in the measuring range of the measured quantities. These contacts change their logic state when the respective signal value is exceeded. In FIG. 9a, it has been assumed that the number of binary contacts is 3. Their function is monitored in each braking cycle by checking the correct logical and time sequence of the switching procedures. As shown in FIG. 9a, the binary contacts are assigned to pedal path s. This has proved to be suitable in one embodiment. The binary signal derived from pedal position s0 represents a brake light contact. If measuring signals a and b are inconsistent, these binary quantities are used for locating the defect. This is accomplished by comparing the respective braking forces with the braking force assigned to a certain switch position (e.g., Fm1 shown in FIG. 9a). This comparison can, however, be only performed in the contact positions. In FIG. 9b, the correct characteristic curve Fm and the defective characteristic curve 1 coincide in the contact positions. If errors occur that cannot be noticed in the switch contact position but only in the intermediary intervals, the defective channel cannot be detected as described above. Therefore a default value is defined in the interval between two binary contacts. Another default value is defined above the contact assigned to the greatest position value.

Figure 10:
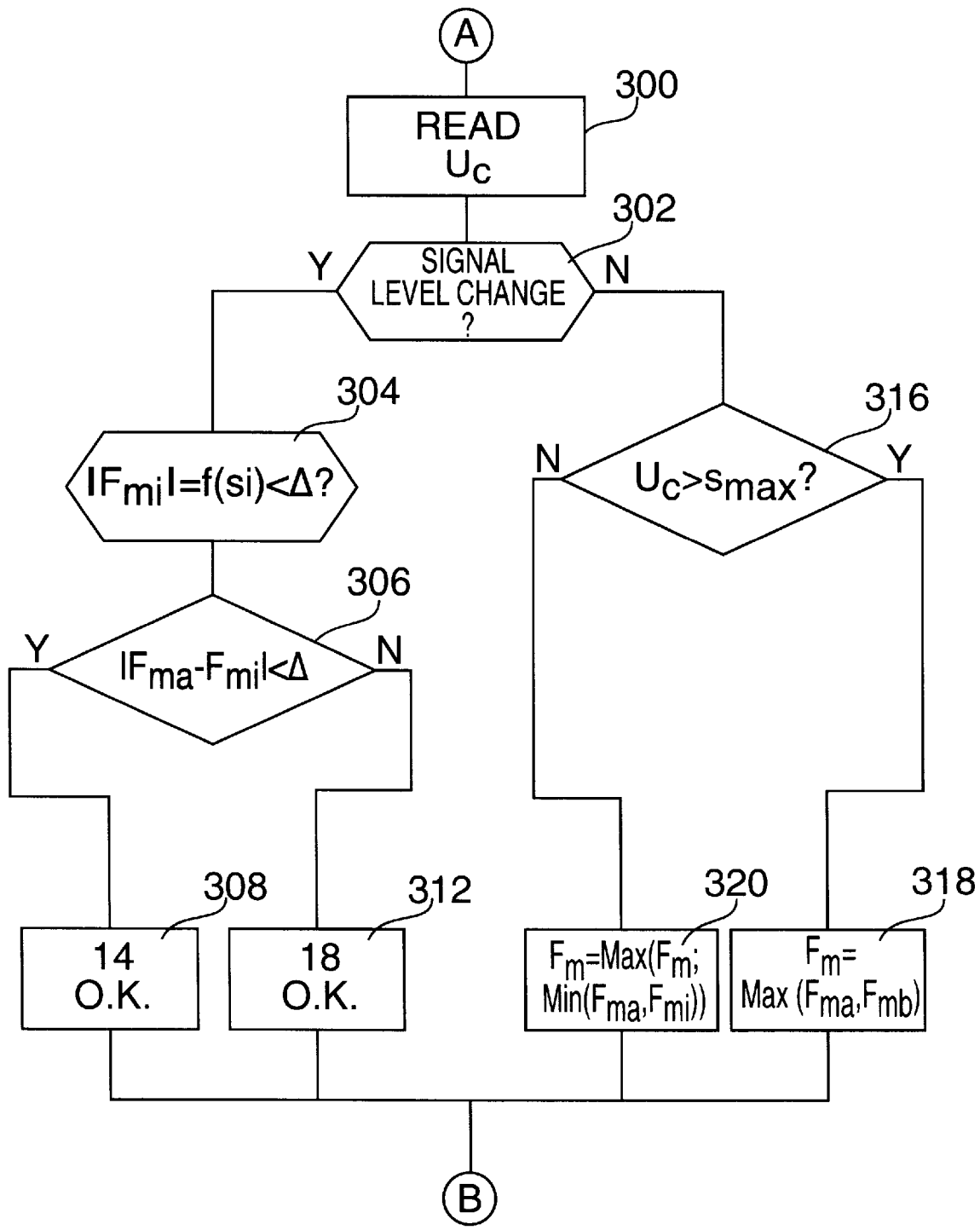
FIG. 10 shows a flow chart of the second embodiment for identifying the error according to the present invention.

An example of a corresponding procedure is illustrated in FIG. 10 using a flow chart. In the first step 300, the logic state of the monitoring component UC is read. In the subsequent query step 302, the program branches off to step 304 if the signal level has changed. In step 304, the braking force Fmi assigned to the current contact point Si is determined, and in the subsequent query step 306 the difference between one of the braking forces Fma or Fmb and the calculated value Fmi is formed. This difference, i.e., its absolute value, is compared with a predefined tolerance range Δ, which is preferably dependent on the operating point. If the comparison of braking force Fma with braking force Fmi resulted in the absolute value of the difference being less than the tolerance range, measuring device 14 is acknowledged as error-free in step 308, and the braking command is determined on the basis of measured value Fma, while otherwise measuring device 18 is acknowledged as error-free in step 312, and the braking command is determined on the basis of measured value Fmb. If no signal level change is detected in step 302, it is checked in subsequent step 316 whether the pedal has been actuated outside the latest monitoring contact. If this is the case, the force Fm serving as a basis of the braking command is determined in step 318 from the maximum of braking force values Fma and Fmb (Fm=MAX{Fma, Fmb}). If it is detected in step 316 that the pedal has been actuated between two contacts, the maximum value of braking force Fmi assigned to the closest contact in the direction of the released brake pedal and the minimum value of the calculated braking forces Fma and Fmb is taken as a basis for determining the braking command (Fm=MAX{Fmi, MIN{Fma, Fmb}}) in step 320.

Formation of a default value outside the contact position is appropriately used in a further embodiment according to the present invention with only two measuring without a monitoring component when the error condition cannot be located. In this method, the formula for determining the default value is selected on the basis of one signal (Fma or Fmb).

In addition to comparison with Fma presented in step 306, Fmb can also be used in a similar manner.

Figure 11:
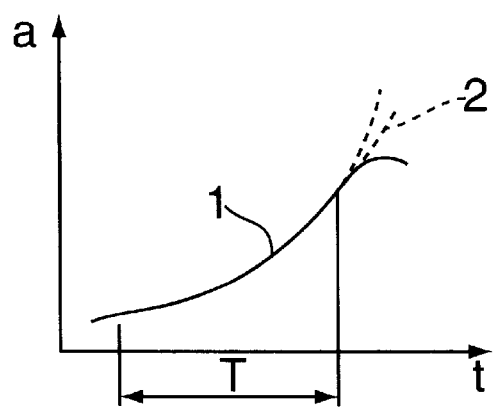
FIG. 11 shows a diagram of a third embodiment of the process according to the present invention.
Figure 12:
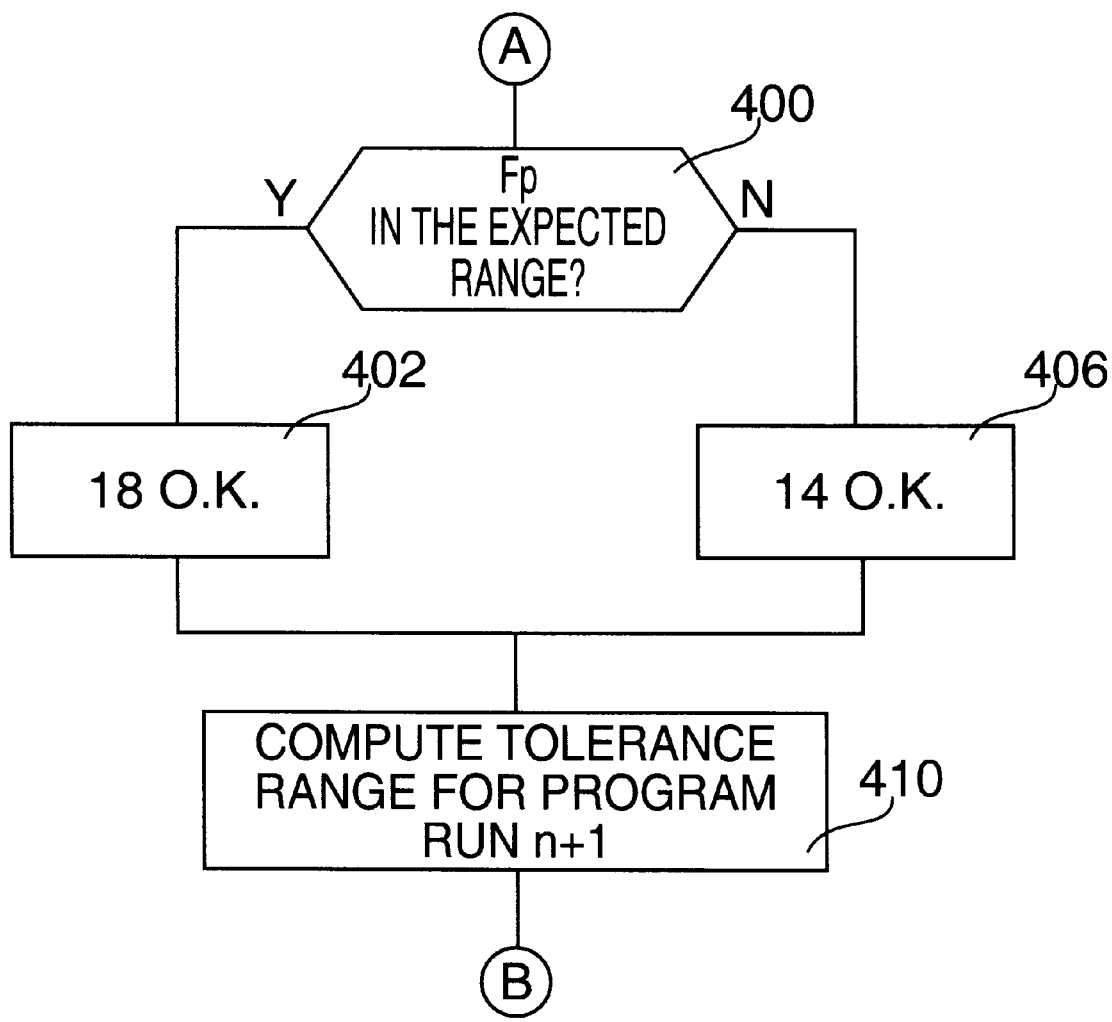
FIG. 12 shows a flow chart of the third embodiment of the process according to the present invention.

A third advantageous embodiment for locating the defect is illustrated in FIGS. 11 and 12. In this embodiment, a tolerance range for the predicted signal variation is defined using mathematical models for the dynamic signal characteristics on the basis of existing measurement data. If the measured signal variation exceeds this tolerance range, an error of the respective signal is identified. In the simplest case, the expected signal value is calculated in each program run on the basis of the value determined in the current and previous program run for short-term prediction, preferably by straight-line extrapolation. A predefinable, preferably operating point-dependent tolerance range, serving as a basis of error detection in the subsequent program run, is placed around the new signal value. In FIG. 11, this method is schematically illustrated using the example of the variation of signal value a over time. The measured signal variation 1 is used, at the end of period T, for determining tolerance range 2 for the predicted signal variation. If the measured signal variation 1 exceeds the tolerance range at the next point in time following range T, an error condition of the corresponding channel is identified.

A similar procedure is illustrated in the flow chart of FIG. 12. In the first query step 400, it is checked whether, for example, the pedal force signal FP is in the expected tolerance range in relation to measuring device 18. If this is the case, measuring device 18 is identified as error-free (step 402) and the value Fmb is used as a basis for calculating the braking command. If the pedal force is not in the expected range, the measuring device 14 is identified as error-free in step 406, and measured value Fma is used as a basis for calculating the braking command. After steps 404 and 408, the tolerance range for the predicted signal variation is calculated in step 410 for the next program run. In another advantageous embodiment, pedal path s is used as a basis for error detection.

What is claimed:

1. A process for at least one of an open-loop control and a closed-loop control of a brake system of a vehicle having a computer system with at least two microcomputers, comprising the steps of:
   determining at least two actuation parameters corresponding to a brake pedal actuation by a driver;
   performing at least one of the following steps:
   (a) determining a driver braking command in a computer system as a function of the at least two actuation parameters, the driver braking command being formed as a function of predefined relationships between the driver braking command and the at least two actuation parameters, the driver braking command being converted into setpoints for controlling wheel brakes; and
   (b) identifying an error as a function of the at least two actuation parameters;
   controlling the wheel brakes in at least one of an open loop and a closed loop as a function of the setpoints;
   wherein at least one of the determination of the driver braking command, the determination of the setpoints, and the identification of the error is performed in each of the at least two microcomputers independently of others of the at least two microcomputers, the at least one of the determination of the driver braking command, the determination of the setpoints, and the identification of the error further being performed in each of two independent processing channels in one of the at least two microcomputers.

2. The process according to claim 1, wherein parameters corresponding to the driver braking command are compared to form a difference, and wherein the error is identified if the difference exceeds a predetermined value.

3. The process according to claim 1, wherein the driver braking command corresponds to a braking force having a braking parameter.

4. The process according to claim 1, wherein a first actuation parameter of the at least two actuation parameters corresponds to a pedal actuation force, and wherein a second actuation parameter of the at least two actuation parameters corresponds to a pedal path.

5. The process according to claim 1, wherein the at least two actuation parameters includes a further actuation parameter corresponding to a monitoring component, the error being identified as a function of the monitoring component.

6. The process according to claim 5, wherein the monitoring component redundantly measures a brake pedal actuation, and further comprising the steps of:

forming a reference value as a function of actuation signals of the monitoring component corresponding to the driver braking command;

determining a further value based on the actuation signals of measuring devices;

comparing the reference value and the further value to form a component difference value; and integrating the component difference value over a predetermined time interval to form an integral value, the integral value having an absolute value to indicate a lack of the error to be identified.

7. The process according to claim 5 wherein the monitoring component has at least one individual switch contact, and wherein the error is identified in a switch position of the at least one individual contact by comparing predetermined reference values with values derived from a measured signal.

8. The process according to claim 1, wherein the driver braking command includes default values determined when the error is identified.

9. The process according to claim 1, further comprising the steps of:

predicting a first signal variation of a measuring signal of a measuring device; and measuring a second signal variation of the measuring signal of the measuring device, the error being identified when the first signal variation differs from the second signal variation.

10. A device for at least one of an open-loop control and a closed-loop control of a brake system of a vehicle, comprising:

a pedal measuring unit determining a pedal actuation by a driver and including at least two measuring devices, the at least two measuring devices determining at least two actuation parameters indicative of the pedal actuation; and at least one electronic control unit including a computer system for determining a braking command and setpoints for controlling wheel brakes, the computer system controlling at least one of the open-loop control and the closed-loop control of the brake system, the computer system having stored relationships between the braking command and the at least two actuation parameters, the computers system forming the braking command as a function of the at least two actuation parameters and the stored relationships, wherein the computer system includes at least two microcomputers receiving the at least two actuation parameters, each of the at least two microcomputers at least one of determining the braking command, determining the setpoints, and identifying an error, and wherein one of the at least two microcomputer performs the at least one of determining the braking command, determining the setpoints, and identifying the error redundantly in two independent software channels.

11. The device according to claim 10, wherein the pedal measuring unit further includes a monitoring component for identifying the error, the at least two measuring devices generating measuring signals provided to the at least two microcomputers, the monitoring component generating a monitoring signal provided to only one of the at least two microcomputers.

12. The device according to claim 10, wherein at least one of the measuring devices and the microcomputers forming the two channels are powered from independent power sources.

* * * * *